No. 640,100. Patented Dec. 26, 1899.
E. H. & C. P. COTTRELL.
APPARATUS FOR CUTTING AND FOLDING PAPER.
(Application filed Sept. 23, 1897.)
(No Model.) 6 Sheets—Sheet 4.

Witnesses:—
M. E. Fletcher
Edward Vieser

Inventors:
Edw. H. Cottrell
Charles P. Cottrell
by attorneys
Brown & Seward

No. 640,100. Patented Dec. 26, 1899.
E. H. & C. P. COTTRELL.
APPARATUS FOR CUTTING AND FOLDING PAPER.
(Application filed Sept. 23, 1897.)
(No Model.) 6 Sheets—Sheet 5.
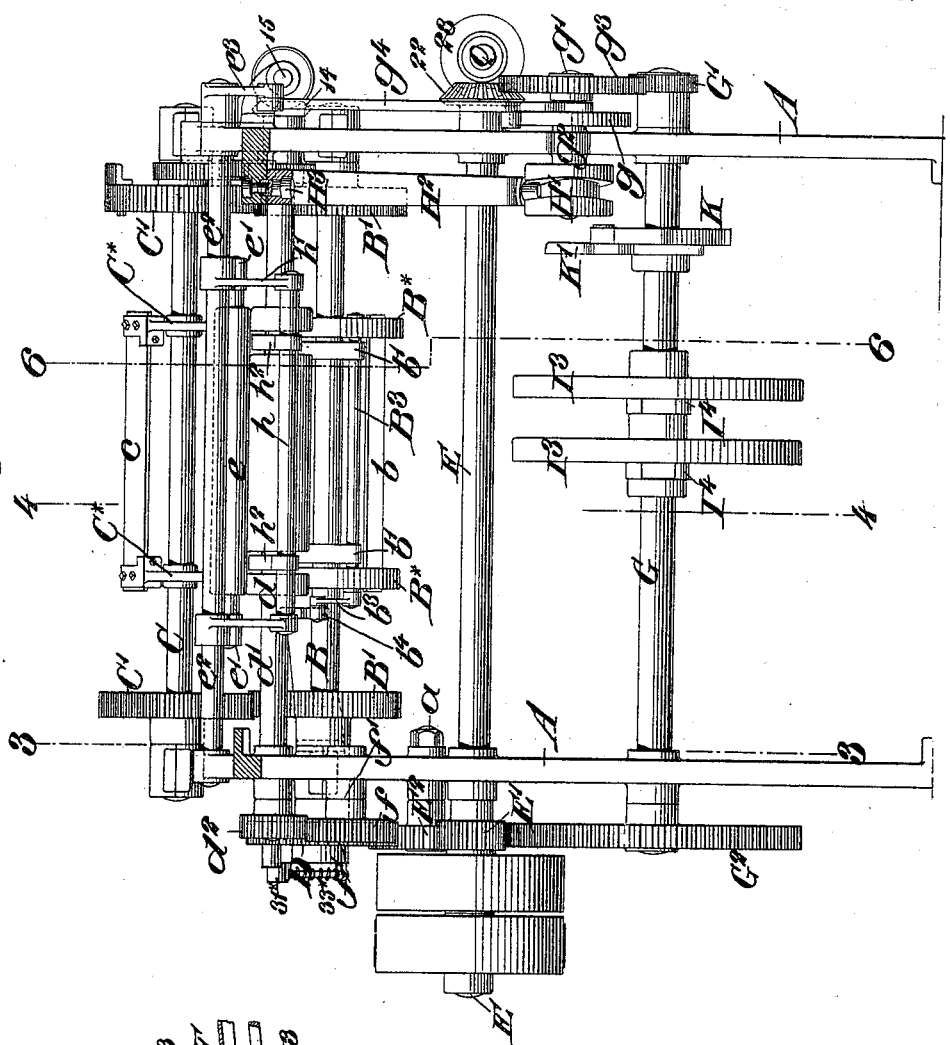
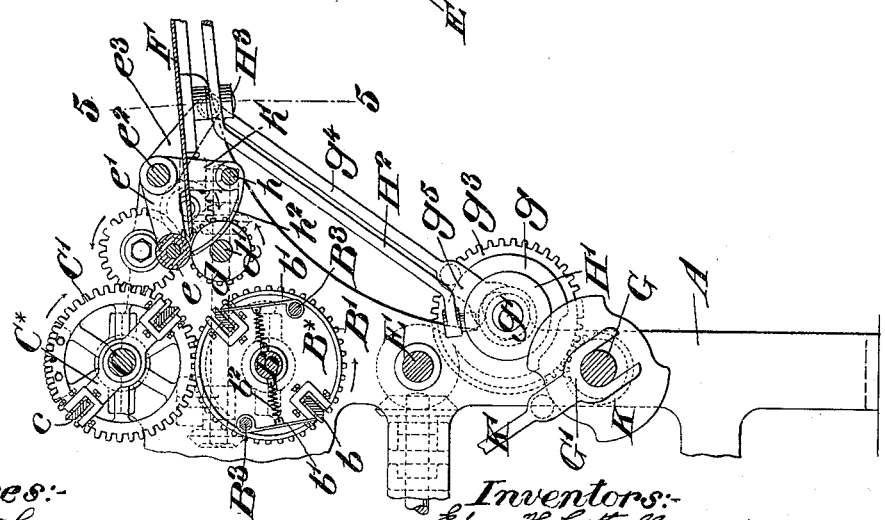
Witnesses:—
M. E. Fletcher.
Edward Vieser.
Inventors:—
Edgar H. Cottrell
Charles P. Cottrell
by attorneys Brown & Seward
THE NORRIS PETERS CO., PHOTO-LITHO., WASHINGTON, D. C.

No. 640,100. Patented Dec. 26, 1899.
E. H. & C. P. COTTRELL.
APPARATUS FOR CUTTING AND FOLDING PAPER.
(Application filed Sept. 23, 1897.)
(No Model.) 6 Sheets—Sheet 6.
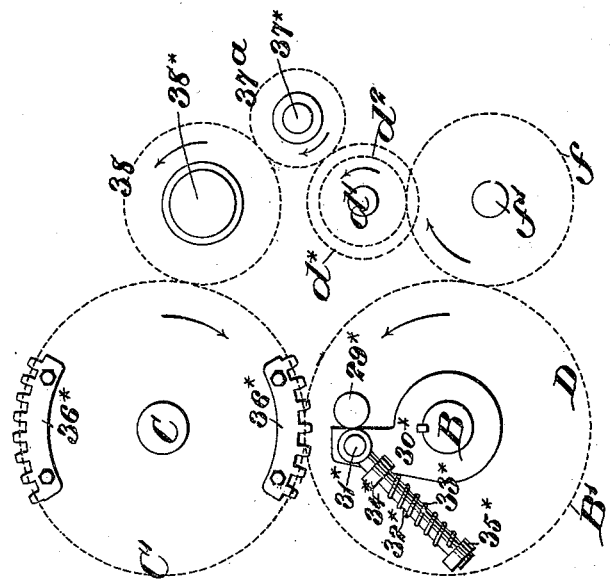
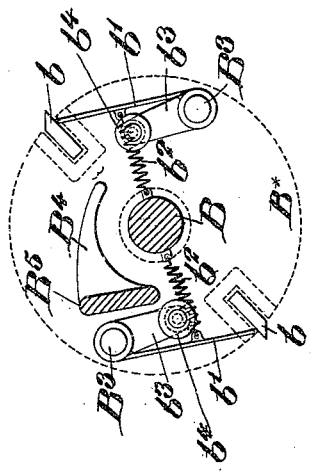
Witnesses:—
M. E. Fletcher.
Edward Vieser.
Inventors.
Edgar H. Cottrell
Charles P. Cottrell
by attorneys.
Brown & Seward

UNITED STATES PATENT OFFICE.

EDGAR H. COTTRELL AND CHARLES P. COTTRELL, OF STONINGTON, CONNECTICUT, ASSIGNORS TO THE C. B. COTTRELL & SONS COMPANY, OF SAME PLACE AND NEW YORK, N. Y.

APPARATUS FOR CUTTING AND FOLDING PAPER.

SPECIFICATION forming part of Letters Patent No. 640,100, dated December 26, 1899.

Application filed September 23, 1897. Serial No. 652,720. (No model.)

*To all whom it may concern:*

Be it known that we, EDGAR H. COTTRELL and CHARLES P. COTTRELL, of Stonington, in the county of New London and State of Connecticut, have invented a new and useful Improvement in Apparatus for Cutting and Folding Paper, of which the following is a specification.

A cutting and folding apparatus embodying this invention in its entirety is more especially intended to be used for taking sheets on each side of which several pages have been printed, cutting said sheets severally into a given number of shorter sheets or sections, assembling each so-cut number of shorter sheets or sections in a pile and while so assembled folding them all together in lines parallel with their so-cut edges, and finally slitting the said assembled and folded sheets or sections at right angles to their folds and cut edges to produce a number of signatures each containing a suitable number of leaves for binding. Some of the features of the improvement are, however, applicable to cutting and folding machines organized otherwise than as hereinabove mentioned.

We have illustrated in the accompanying drawings and will proceed to describe a machine in which our invention is embodied and will afterward point out its novelty in claims.

Figure 1:
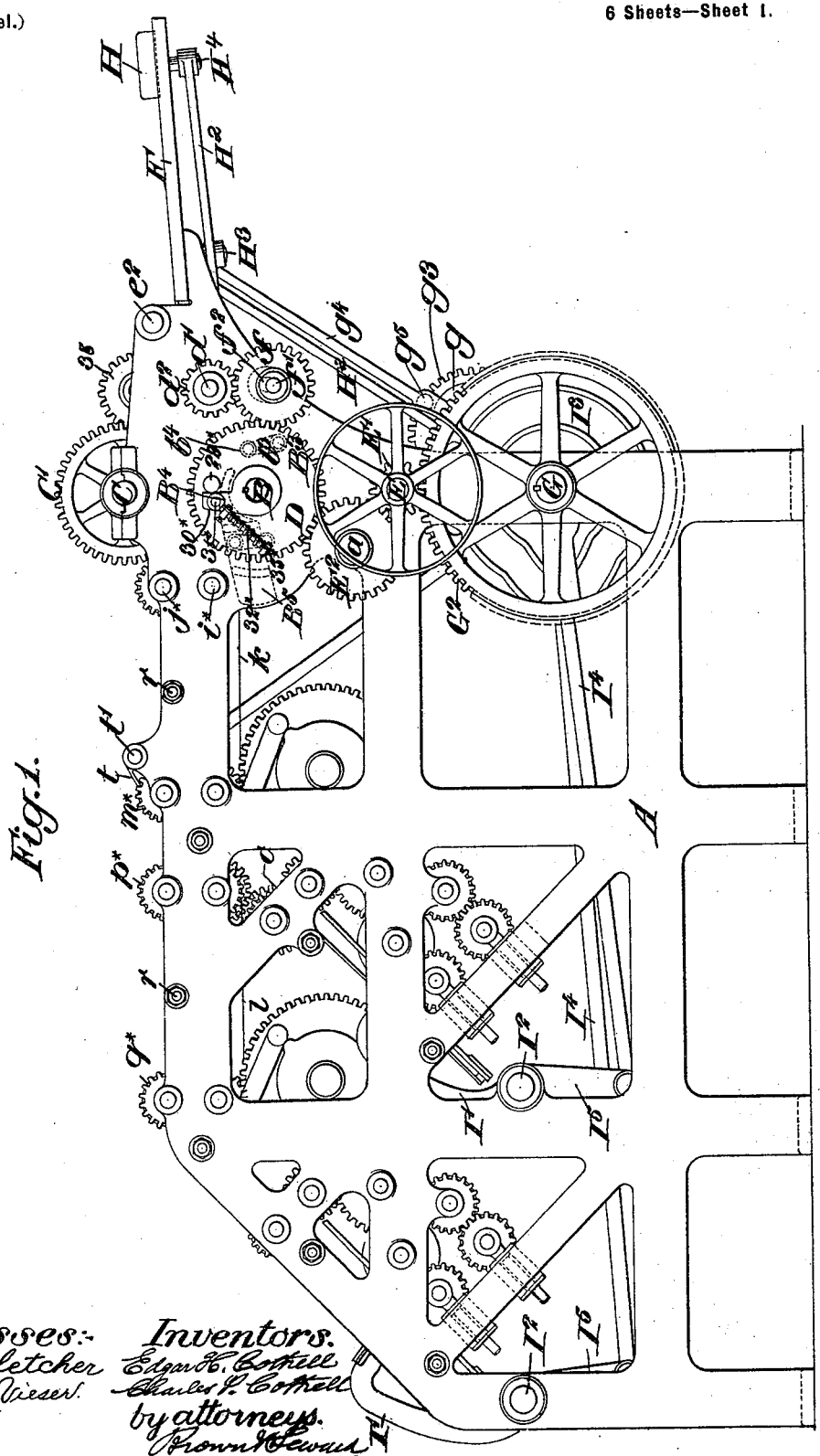
Figure 2:
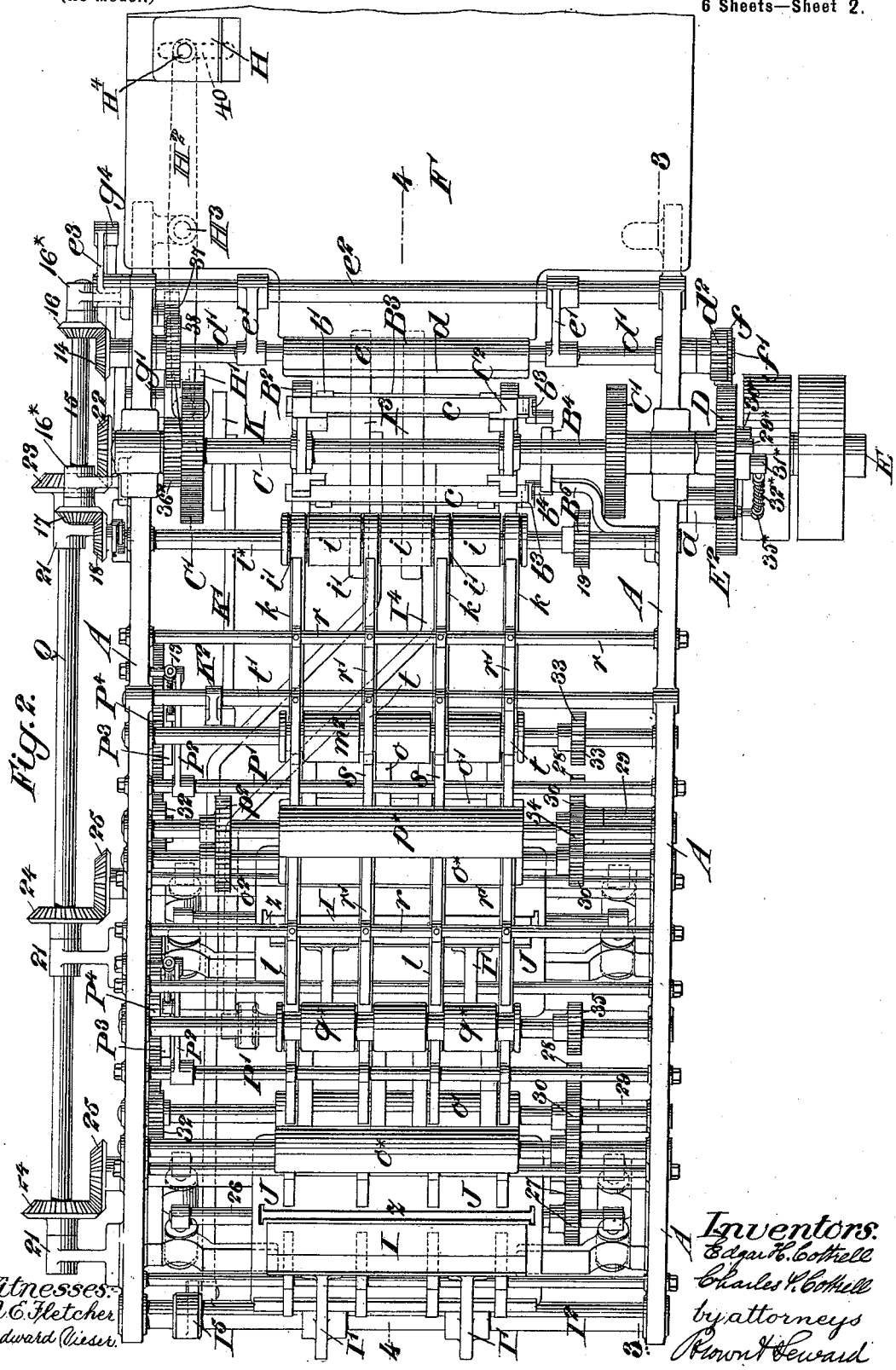
Figure 3:
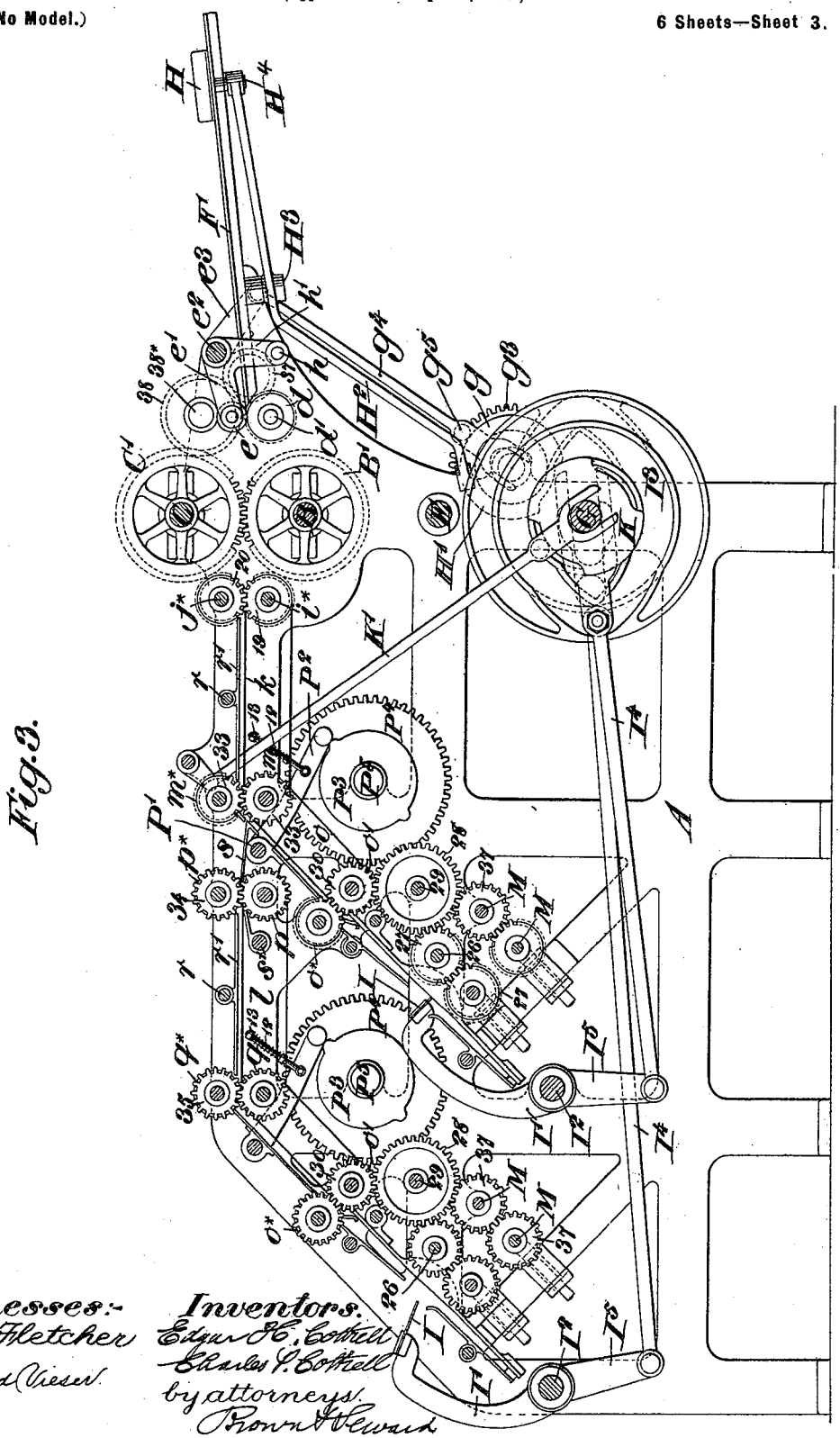
Figure 4:
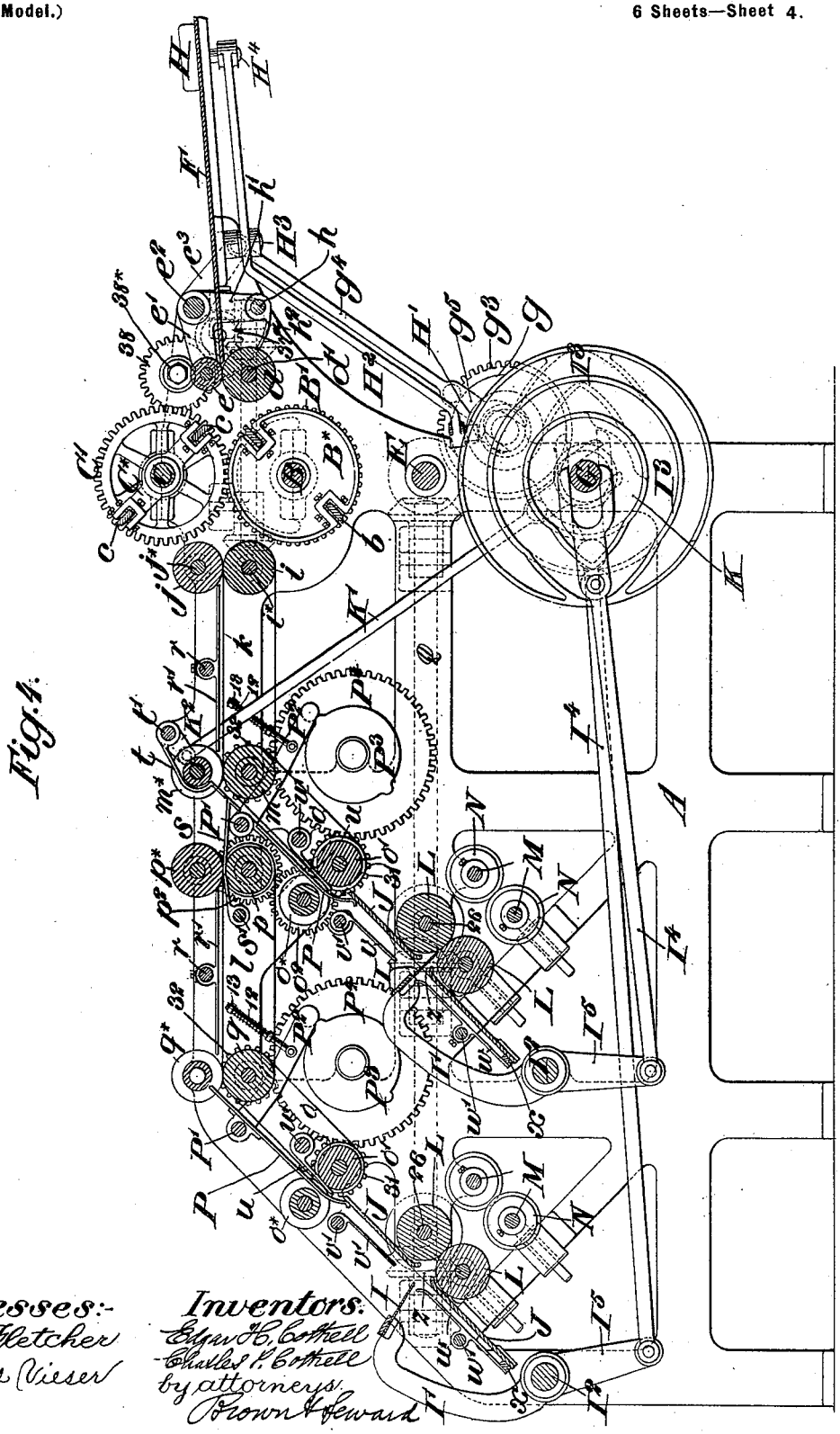

Figure 1 represents a side elevation of the apparatus; Fig. 2, a plan of the same; Fig. 3, a longitudinal vertical section in the line 3 3 of Figs. 2 and 5; Fig. 4, a longitudinal vertical section in the line 4 4 of Figs. 2 and 5; Fig. 5, a front elevation, omitting the feed-board; Fig. 6, a vertical section of the feed-controlling and cutting devices, taken at right angles to Fig. 5, in the line 6 6 of that figure. Figs. 7 and 8 are detail views which will be hereinafter explained.

Similar letters and numerals of reference designate corresponding parts in all the figures.

A designates the framing of the apparatus.

B C are two rotary cutter-shafts mounted in bearings in or on the framing A and carrying the blades $b$ $c$, of which two pairs are represented, one of each pair being mounted in a cutter-stock consisting of heads $B^*$ on the shaft B and the other in a cutter-stock consisting of heads $C^*$ on the shaft C. The said cutter-shafts are geared together to cause the edges of their blades to move at the same speed by two pairs of gears $B'$ $C'$, fast upon them, and the lower one, B, is furnished with another spur-gear D, through which it receives rotary motion from the driving-shaft E of the apparatus, the said shaft E being furnished with a spur-gear $E'$, Figs. 1 and 5, which gears with a gear $E^2$, running loosely on a fixed stud $a$ and gearing with the gear D. The cutters may be such as are now in use, and therefore need no further description; but in order to counteract the tendency (which is common in the operation of such cutters) of the edges of the paper from which sheets or sections have been cut by them to stick or to move downward with the edges of the lower cutters after the cutting has been performed we have applied to the said cutters and their heads $B^*$ the devices which are described as follows with reference to Figs. 1, 2, 5, 6, and 7, the last mentioned of these figures being a side view including all of the said devices detached from the other parts of the apparatus, the cutter-head $B^*$ only being shown in dotted outline.

$B^3$ $B^3$ are light rock-shafts, one for each cutter $b$, mounted parallel with their shaft B in bearings in the cutter-heads $B^*$ and furnished with cutter-clearing fingers $b'$, the points of which in their normal condition are held against the front of the cutters $b$, just within their edges, by springs $b^2$, attached to their shaft B. These rock-shafts $B^3$ are each furnished at one end with an arm $b^3$, at the end of which is a roller $b^4$, which with every time the respective cutter $b$ has passed by the corresponding cutter $c$ after the cutting operation runs in contact with a stationary cam $B^4$, carried by a bracket $B^5$, secured to the framing A. In so running against this cam the arm $b^3$ is forced outward from the center of the cutter-shaft and caused to similarly move the fingers $b'$, and thereby to so press them outward against the edge of the paper from which a sheet has been cut as to lift or prevent the descent of said edge and so carry it forward a short distance that it may present itself properly to such carrying devices as may be employed to carry it forward to be folded.

F is a feed-board such as is commonly used in printing-machines, upon which the sheets to be cut into sections and folded are placed. In front of the feed-board F there are arranged behind the cutter-shafts and cutters two feed-rollers $d$ $e$, Figs. 5 and 6, for receiving the sheets from the feed-board and carrying them to the cutters. The lower feed-roller $d$ is carried by a shaft $d'$, working in fixed bearings in the framing and furnished with a spur-gear $d^2$, and said roller is driven constantly by the spur-gear D, hereinbefore mentioned, on the lower cutter-shaft B, through an intermediate gear $f$, Figs. 1 and 5, which works loosely on a fixed stud $f'$ and gears with the said gears $d^2$ and D. The upper feed-roller $e$ is a drop-roller and is driven by the lower one through the friction of the paper passing between them, the journals of the said roller being hung in arms $e'$, which are secured to a rock-shaft $e^2$, which works in bearings in the framing A. To produce the rise and fall of the roller $e$, the said rock-shaft is furnished with an arm $e^3$, to be operated upon by a cam $g$, Figs. 3 and 5, on a short shaft $g'$, which works in a stationary bearing $g^2$ on the framing, the said shaft $g'$ being furnished with a gear $g^3$ on its outer end, through which it is driven by a gear G' on a shaft G, which works in fixed bearings in the framing and which is furnished with another gear $G^2$, through which it derives motion from the same gear E', before mentioned, on the driving-shaft E through which the cutters and the feed-roller $d$ are driven. The connection between the cam $g$ and the arm $e^2$ consists of a rod $g^4$ and an attached yoke $g^5$, which engages with the cam. The rock-shaft $e^2$ also carries a stop-gage consisting of a rod $h$, carried by arms $h'$ on the rock-shaft and having attached to it curved fingers $h^2$. These fingers are projected upward in front of the feed-board when the drop-roller $e$ rises and are depressed when the drop-roller descends. In order that the said fingers $h^2$ may come up in front of the bite of the feed-rollers, the roller $d$ is grooved for the passage of the said fingers. On the top of the feed-board, near one side thereof, there is a laterally-reciprocating jogger H for the purpose of bringing the sheets to a proper position laterally when placed upon the board against the gage-fingers $h^2$. This jogger is operated by a cam H' on the short shaft $g'$ through a lever $H^2$, which works on a fixed fulcrum $H^3$ under the feed-board and which is connected with the jogger by a pin $H^4$, which works through a slot 40 in the board.

The folding devices represented for folding at one operation parallel with their cut edges the several sections into which the original sheets are severally cut comprise, as shown in Figs. 2, 3, and 4, folding-blades I, which are parallel with the rollers $i$, $j$, and $m$ $m^*$, and stationary tables consisting of slotted plates J, arranged below the level at which the cutters $b$ $c$ meet and operate and having an inclination downward in the direction in which the meeting cutters $b$ $c$ move. There are two sets of said devices, arranged one in advance of the other in the direction of the above-mentioned movement, one set for the purpose of folding the several sections into which every other larger or longer sheet fed from the feed-board F is cut by the said cutters and the other set for the purpose of folding the corresponding sections into which the intervening larger sheets are so cut. The said blades are carried by the arms I' of rock-shafts $I^2$, which are arranged in bearings in or on the framing A. The said rock-shafts derive their necessary movement for operating the folding-blades from two similar cams $I^3$ on the shaft G, hereinbefore mentioned, the arrangement of said cams on the said shaft being such that the said blades operate alternately at regular intervals, once for every sheet presented to the cutters. The connections between the cams $I^3$ and the rock-shafts $I^2$ consist, as shown in Fig. 4, of yoke-rods $I^4$ engaging with the cams and connected with downwardly-projecting arms $I^5$ on the rock-shafts.

Forward of the cutters $b$ $c$ there is arranged a pair of rollers $i$ $j$, fast on shafts $i^*$ $j^*$, running in bearings in or on the framing, said rollers having a surface speed corresponding with that of the feed-rollers $d$ $e$. The feed-rollers $d$ $e$ and the rollers $i$ $j$ may be considered as parts of one set of carrying devices for presenting the sheets to the cutters. For carrying the sections forward to the folding devices we employ two sets of endless carrying-tapes $k$ $l$, the tapes $k$, nearest the cutters, receiving all the sheet-sections and those $l$, farther forward, receiving from $k$ only those sections which are to go to the second set of folding devices—that is to say, the set farthest from the cutters. The roller $i$ is made in a number of short sections, as shown in plan in Fig. 2, in which the top roller $j$ is omitted, and between these sections there are narrow rollers $i'$, (see Fig. 2,) which are loose on the shaft $i^*$ and on which run the tapes $k$, which also run on and are driven by the lower one, $m$, of a pair of rollers $m$ $m^*$, which run in bearings in or on the framing. These rollers $m$ $m^*$, tapes $k$, and loose rollers $i'$ constitute a set of carrying devices independent of the set constituted by the rollers $d$ $e$ and $i$ $j$, and they have a greater surface velocity than the latter rollers, so that the sheet-sections, as they are successively received from the rollers $i$ $j$ by the tapes $k$ and the rollers $m$ $m^*$, have their movement accelerated. Consequently the cut rear edge of each is separated from the corresponding cut front edge of its successor far enough to obviate all liability to interference between the successive sections on their way to the folding devices. The tapes $l$ run on rollers $p$ $q$, which are supported in fixed bearings and have top rollers $p^*$ and $q^*$ applied above them.

Between the tapes $k$ and the first folding plate or table J—that is to say, the one nearest the cutters $b$ $c$—there is an intermediate set of carrying-tapes $o$, which run on the same roller $m$ with the tapes $k$ and on a roller $o'$, so arranged in fixed bearings as to give said tapes $o$ a downward inclination. Between the tapes $l$ and the second folding plate or table J there is another and similarly-arranged set of intermediate carrying-tapes $o$, which run on the same roller $q$ with the tapes $l$ and on a roller $o'$ above the said folding-plate. Each of the two rollers $o'$ has applied to it a top roller $o^*$. The rollers $p$ $p^*$, $q$ $q^*$, and $o'$ $o^*$ all rotate with the same surface velocity as the rollers $m$ $m^*$.

The tapes $k$ and $l$ have respectively arranged above them stationary transverse guard-rods $r$, to which are attached guards $r'$, which confine the sheet-sections flatly upon the tapes. Between the rollers $p$ $p^*$ there are arranged stationary guide-fingers $s$, attached to a fixed transverse bar $s'$, for the purpose of preventing the downward passage of the cut sheet-sections over the tapes $o$ to the first folding-plate J, except when so directed by the movable switch $t$, which will be presently described. Above each of the tape-rollers $o'$ there is arranged a stationary transverse bar $u'$, which carries fingers $u$ for supporting the sheet-sections beyond the bite of the rollers $o'$ $o^*$. The rollers $p$ and $o'$ are grooved circumferentially for the passage between them and their respective top rollers of the fingers $s$ and $u$. In front of the upper and rear parts of the folding-plates J, in rear of the slots provided therein for the blades I, there are fixed guide-fingers $v$, attached to a stationary transverse bar $v'$, and below and in front of the parts of the said plates below the said slots there are fixed guide-fingers $w$, attached to a stationary transverse bar $w'$. Near and parallel with the lower edges of the folding-plates J there are attached to the faces of said plates stops $x$ to stop the sheet-sections in such positions that the blades will fold them midway between their upper and lower edges.

The switch $t$, before mentioned, (see Figs. 2 and 4,) is for the purpose of directing downward to the first folding-plate J the sheet-sections cut from every other sheet as they come from the tapes $k$ and rollers $m$ $m^*$ and of letting the sections from the intermediate or alternate sheets pass by the first set of tapes $o$ and over the guide-fingers $s$ to the rollers $p$ $p^*$, tapes $l$, and rollers $q$ $q^*$, thence to the second set of tapes $o$ and rollers $o'$ $o^*$ and to the second set of folding devices. The said switch consists of fingers $t$, which are affixed to a rock-shaft $t'$, working in fixed bearings on the top of the framing behind the roller $m^*$, and which extend over the said roller, preferably through circumferential grooves therein. The raising of this switch to let the sheet-sections pass by the first set of tapes and the guides and the lowering of the same to the position shown in Fig. 4 to direct the sheet-sections downward under the points of the guide-fingers $s$ and onto the tapes $o$, leading to the first folding apparatus, are performed by a cam K (see Fig. 6) on the shaft G, acting through a yoke-rod K', connected with an arm K² on the rock-shaft $t'$.

In order to insure the delivery of the cut sheet-sections to the folding-plates J, so that they will properly and evenly arrange themselves one upon another thereon, we provide, as shown in Figs. 2 and 4, above or in front of each set of tapes $o$ and its corresponding supporting-fingers $u$, a presser consisting of a rock-shaft P', arranged in fixed bearings and having attached to it fingers P, corresponding in number with the said supporting-fingers and arranged exactly over them. These presser-fingers pass, as shown in Fig. 4, through circumferential grooves in the rollers $o^*$ and project beyond the rollers $o'$ $o^*$ far enough beyond the supporting-fingers $u$ for their ends to overlap the upper or rear edge of their respective folding-plate J, the said ends being turned downward over the ends of the supporting-fingers. The said fingers P are, except just while the front edge of a sheet-section is passing from the bite of the rollers $o'$ $o^*$ to the folding-plate, held up clear of the folding-plate by means of a spring 12, applied between an arm P² on the rock-shaft P' and a bearing 13 on the framing; but while the front edge or head of the sheet is so passing the said fingers are depressed by the action on the rock-shaft arm P² of a cam P³, which is carried by a gear P⁴, turning on a fixed stud P⁵, and to which rotary motion is imparted, as hereinafter described. The object of this depression of the fingers, which, owing to the form of the cam P³ and the lively action of the springs 12, is only instantaneous, is to hold down the rear portion of each preceding sheet-section flat upon the inflexible surface of the folding-table and prevent it from curling up at the moment while the head or front edge of the succeeding sheet commences to overlap it and so obviate the possibility of the succeeding sheets passing under or being interfered with by the preceding ones. This operation may take place either before or after the preceding sheet arrives at the stop $x$, and if it should take place before, the temporary arrest of the preceding sheet thus produced will be only instantaneous and the former sheet would pass onward to the stop after the rise of the presser-fingers.

In order further to insure the passage of the heads of the sheets over the tails of their predecessors, the folding-tables J are set, as shown in Fig. 4, with their faces a little below or behind the bite of the rollers $o'$ $o^*$ and the path of the carrying-surfaces of the tapes $o$, or, in other words, the carrying-surfaces are arranged in a plane above the plane of the folding-table.

Under each of the folding-plates J there are arranged in suitable fixed bearings pinching-rollers L L, between which the sheet-sections, partly folded by the passage of the folding-blades through the the slots $z$ of the folding-plates J, are driven by the said blades, and by which the folds are completed. Under each pair of pinching-rollers are arranged in suitable fixed bearings two parallel shafts M M, which carry at equal distance apart one or more pairs of circular slitting-cutters N N, between which the sheet-sections which have been folded together are carried by the pinching-rollers and cut at right angles to their folds at as many places as may be necessary to produce the number of similar signatures desired.

The rollers $i\ j$, which it has been before mentioned are driven with the same surface velocity as the feed-rollers $d\ e$, corresponding with the speed of the cutter-edges, are represented as driven by a bevel-gear 14 on the feed-roller $d$ through a short side shaft 15, (shown in full outline in Figs. 2 and 5 and in dotted outline in Fig. 4,) arranged in fixed bearings $16^*$ outside of the framing A and carrying two bevel-gears 16 17, one of which gears with 14 and the other with a bevel-gear 18 on the shaft $i^*$ of the roller $i$. The rollers $i\ j$ are geared together by spur-gears 19 20 on their respective shafts.

The accelerated rollers $m\ m^*$, the tapes $k$, and all the other tapes and rollers for carrying the cut sheet-sections, as well as the presser-cam $P^3$, are all driven or operated through a long side shaft Q, (shown in full outline in Figs. 2 and 5 and in dotted outline in Fig. 4,) which runs in fixed bearings 21 outside of the framing A and which derives motion from the main shaft E through a pair of miter-gears 22 23. This shaft Q gives motion to the upper pinching-rollers L of the two folding apparatus through a miter-gear 24 on the said shaft and a corresponding miter-gear 25 on the shaft 26 of each of said rollers L, and from the said shafts 26 the rollers $m^*\ m^*\ o'\ o^*\ q\ q^*$ and their respective carrying-tapes derive motion by gearing as follows, which is illustrated completely in Fig. 3 and partly in Fig. 2: A gear 27 on each roller-shaft 26 gears through a gear 28 on a fixed stud 29 with a gear 30 on the roller $o'$ and so drives the said roller and the carrying-tapes $o$. The said roller $o'$ carries a gear 31, which gears with the cam-gear $P^4$ and drives the presser-cam $P^3$. This gear $P^4$ gears with and drives a gear 32 on the tape-roller $m$, and so drives the said roller and the tapes $k$. The rollers $m\ m^*$ are geared together by gears 33 on their respective shafts, and in like manner, as illustrated in Figs. 2 and 3, the rollers $p\ p^*$, the rollers $q\ q^*$, and those L L are respectively geared each with its fellow, those $p\ p^*$ by gears 34, those $q\ q^*$ by gears 35, and those L L by gears 27. The shafts M M of the slitting-cutters N N are geared together by pairs of gears 37, and one of each pair is geared with and driven by one of the gears 28, before mentioned. The roller $o^*$ carries a gear $o^2$, which gears with a gear $p^2$ on the roller $p$, and so drives the rollers $p\ p^*$ and the tapes $l$.

We have represented in the drawings and will hereinafter describe a provision for varying the relation between the speed of the cutters, the feed-rollers $d\ e$, and the rollers $i\ j$ relatively to that of the several carrying-tapes and their rollers for cutting sheets of different sizes into a given number of sections of equal length; but before describing that provision we will, for the sake of rendering such description more easily understood, first describe the operation of the machine for cutting sheets of one size, and for that purpose we will assume that the gear D on the cutter-shaft B, through which the cutters are driven, is fixed upon said shaft. This operation is as follows: The apparatus having all its parts in motion, as hereinbefore described, the sheets to be cut and folded are deposited one at a time in any suitable manner, as by hand, onto the feed-board, and while the gage-fingers $h^2$ and the drop-roller $e$ are raised the so-deposited sheet is pushed forward between the rollers $d\ e$ to the said fingers. The said fingers and the drop-roller being then depressed, the sheet is seized by the rollers $d\ e$ and carried forward to and between the cutters, by which it is cut into the determined number of sections, (four in the present case,) which are successively carried forward by the rollers $i\ j$, and thereby deposited upon the tapes $k$, on which they pass to the rollers $m\ m^*$, the movements of which and of the tapes being accelerated produce the separation of the several sections, as hereinbefore described. In this separated condition the sections of one sheet, while the first switch $t$ is depressed, are directed to the tapes $o$, from which they are taken by the rollers $o'\ o^*$ and deposited on the first folding-plate J, down which, while the presser P is periodically raised, they successively slide and drop one after the other upon its stop $x$. The next following sheet is fed and cut into sections in the same way, and its sections are carried forward in the same way with the accelerated movement; but before the first of said sections arrives at the switch $t$ the latter is raised to allow the said section to pass by it to the rollers $p\ p^*$, tapes $l$, rollers $q\ q^*$, and the second set of tapes $o$ and rollers $o'\ o^*$, and the said switch continues raised while all the sections of the last-mentioned sheet have been deposited on the second folding-plate, after which the switch is again depressed to direct the sections of the next following sheet to the first folding-table, and in this way the operation proceeds, the cut sections of every other sheet going to one and those of the alternate intervening sheets to the other folding-table. When all the sections of a sheet have been deposited on either folding-table, its folding-blade drives it in folded condition through the slot in the table and between the pinching-rollers L L, which complete and sharpen the fold and carry the so-folded sections between the slitting-cutters N N, by which they are slit into signatures, the number of which depends upon the number of slitting-cutters employed.

We will now proceed to describe the provision for cutting sheets of different sizes, which is illustrated in Figs. 1 and 2, partly in Figs. 4, 5, and 6, but particularly in Fig. 8, which is a diagrammatic side view in which all the parts involved in said provision are represented, but of the gears only the pitch-lines are shown.

It is obvious that at the time of cutting the edges of the cutters $b\ c$ should move at the same velocity as the surfaces of the feed-rollers $d\ e$. It is also obvious that for cutting sheets into a given number of sections the length of paper requiring to be fed during each revolution of the cutters is greater for a longer than for a shorter sheet. In order, therefore, to adapt the same machine to the cutting and folding of sheets of different length, we provide for feeding the greater length of paper during each revolution of the cutters by simply changing the gear $d^2$, hereinbefore mentioned, on the feed-roller $d$ for a smaller one, so that the rollers $d\ e$ and $i\ j$ are caused to run at a greater speed, and the paper is caused to be thereby fed and carried at a greater speed, and in order to correspondingly increase the speed of the cutters at the time of cutting without increasing the number of their revolutions we provide for the temporary acceleration of their movement during those portions of each of their revolutions in which they are actually engaged in cutting. This temporary acceleration of the cutters we provide for in the following manner: Instead of making the gear D (through which the cutter-shafts, the feed-rollers $d\ e$, and rollers $i\ j$ have been described as driven) fast on the cutter-shaft B we make the said gear loose on the said shaft B, and we provide on the outside of the said gear D, as shown in Figs. 1 and 8, a projecting pin 29*, and we secure fixedly upon said shaft an arm 30*, against which the said pin may act directly to drive the shaft, and we also attach to the said arm by a pivotal connection 31* a rod 32*, around which is a coil-spring 33*, which acts between a shoulder 34* on said rod and a guide 35* for the said rod, provided on the gear D, to press the said arm 30* toward the pin 29*. This permits the cutter-shaft to run forward a certain distance independently of the gear D, and thus permits the speed of the cutter-shafts and cutters to be accelerated during a certain portion of their revolution. To make this temporary acceleration correspond with the speed of the rollers $d\ e$ and rollers $i\ j$, there is provided on one of the gears C' on the upper cutter-shaft two toothed sectors 36*, the teeth of which correspond with those of the gears C' and which are adapted to gear through intermediate gears 37ª 38, arranged loosely on fixed studs 37* and 38* on the framing, with a second gear $d^*$ on the shaft $d'$ of the feed-roller $d$. If the gear $d^2$, before mentioned, on the feed-roller shaft $d'$ and the gear $d^*$, just mentioned, should have the same number of teeth, which would be the case when sheets of the smallest desired length are to be cut, the arm 30* on the cutter-shaft B and the pin 29* on the gear D would remain in contact and the cutter-shafts and the feed-rollers $d\ e$ and rollers $i\ j$ would operate as though the gear D were fast on the cutter-shaft B, as previously described; but when, for the cutting of longer sheets, the gear $d^2$ is changed for a smaller one, as indicated by the dotted pitch-circles of $d^2$ and $d^*$ in Fig. 8, and the feed-rollers $d\ e$ and the rollers $i\ j$ are driven at a greater velocity the cutter-shafts are still driven by the action of the pin 29* of the gear D during the greater portion of each of their revolutions and without any increase of velocity; but just before either pair of cutters $b\ c$ comes into operation one of the sectors 36* comes in gear with the gear 38, and thus the cutter-shafts while the cutters are in operation are driven through the feed-roller $d$ at the accelerated velocity corresponding with the speed of said roller. During this acceleration the arm 30* runs away from the pin 29*; but after the cut, the sector 36*, having passed clear of the gear 38, permits the spring 33* to press the arm 30* backward until it is overtaken by the pin 29*, which then drives the cutter-shafts until the next sector comes into gear with 38 for the next cutting operation. In order to provide for the keeping of the gear $d^2$, whatever the number of its teeth, properly in gear with the gear D, the shaft $f'$, (see Fig. 1,) which carries the loose intermediate gear $f$, is adjustable higher or lower in a slot $f^2$. (Shown in dotted outline in that figure.)

It may here be mentioned that the devices just described for accelerating the speed of the cutters during a portion of their revolution are the same as those described in Letters Patent No. 466,030 as adapted to the cutting of sheets from a web and feeding them to a printing-machine.

It may be observed that the acceleration of the several carrying-tapes and their driving and supporting rollers, hereinbefore described, relatively to the speed of the feed-rollers $d\ e$ and rollers $i\ j$ must be such that the said tapes and their rollers will have a velocity greater than that which the feed-rollers $d\ e$ and rollers $i\ j$ have for feeding the longest sheets in order that the several sections cut from each sheet may have their adjacent cut edges separated, as hereinbefore described, the velocity of the several tapes and their rollers being invariable relatively to that of the driving-shaft E of the apparatus.

What we claim as our invention is—

1. In a machine for cutting sheets of paper into shorter sheets or sections and folding said sheets or sections together, a cutting device, feeding devices comprising a feed-board and a stop-gage for feeding sheets to said cutting device to be thereby cut into shorter sheets or sections, a stationary folding-table, carrying devices for placing a number of the so-cut shorter sheets or sections each in a single layer directly one upon another in direct contact with each other upon said table, and folding devices for folding together the so-placed sheets, all in combination substantially as herein described.

2. In a machine for cutting sheets of paper into sections and folding said sections together, the combination with a cutting device and a stationary folding-table, of feeding devices comprising a feed-board and a stop-gage for feeding the sheets to the cutting device in a direction transverse to the length of the cutting edges thereof, carrying devices running transversely to said cutting edges for carrying the cut sheet-sections from the cutting devices to the folding-table and depositing them thereon each in a single layer and directly one upon another and in direct contact with each other, and folding devices for folding together the so-deposited sheets, substantially as herein described.

3. In a machine for cutting sheets of paper into shorter sheets or sections and folding said sheets or sections together, the combination of a cutting device, feeding devices comprising a feed-board and a stop-gage for feeding sheets to said cutting device to be thereby cut into shorter sheets or sections, a stationary folding-table, carrying devices for placing a number of the so-cut shorter sheets or sections each in a single layer directly one upon another in direct contact with each other upon said table, and folding devices for folding together the so-placed sheets, the said cutting devices being arranged between the feed-board and the folding-table at such distance from the latter as to cut the sheets into sections before the arrival of the sheets upon the folding-table, substantially as herein described.

4. The combination with the rotary cutters and folding devices arranged in advance thereof, of the rollers $i\,j\,i'$ carrying tapes $k$ and rollers $m\,m^*$ located between said cutters and folding devices, the said rollers $i\,j$ running together with a surface velocity corresponding with that of the edges of the cutters, the said rollers $m\,m^*$ running together with a greater surface velocity, the rollers $i'$ being loose on the shaft of the roller $i$ and the tapes running on the rollers $m$ and the loose rollers $i'$ with an accelerated velocity relative to the rollers $i\,j$, substantially as herein described.

5. The combination of a cutting apparatus, carrying devices for presenting to said apparatus sheets to be thereby cut into sections, a set of endless tapes and supporting and driving rollers therefor arranged in advance of and having a speed greater than that of said carrying devices and cutting apparatus, folding devices comprising an inclined slotted table arranged in advance of and below said set of endless tapes, and a second set of endless tapes arranged between the first-mentioned set and the said table and above the said table and having a downward inclination toward and corresponding with that of the said table, substantially as herein described.

6. The combination of a cutting apparatus, two sets of folding devices arranged one before the other in advance of said cutting apparatus, a set of tapes and carrying and driving rollers therefor between the cutting apparatus and the first set of folding devices, a second set of tapes and carrying and driving rollers therefor between the two sets of folding devices and stationary guides for supporting cut sheets between the two sets of carrying-tapes, substantially as herein described.

7. The combination of a cutting apparatus, two sets of folding devices arranged one before the other in advance of said apparatus, a set of tapes and carrying and driving rollers therefor between the cutting apparatus and the first set of folding devices, a second set of tapes and carrying and driving rollers therefor between the two sets of folding devices, a movable switch between the first and second sets of tapes, and means for operating said switch for alternately directing the cut sheets received from the cutting apparatus by the first set of tapes to the first set of folding devices and to the second set of tapes, substantially as herein described.

8. The combination of a folding apparatus which comprises a slotted folding-table and a folding-blade, a carrier for delivering to said table one after and upon another a plurality of sheets to be folded together, a reciprocating presser and means for operating the same for holding down the rear edge of an advanced sheet upon the inflexible surface of said table and preventing said edge from curling up into the path of the succeeding sheet, substantially as herein described.

9. The combination of a folding apparatus which comprises a slotted folding-table and a folding-blade, a set of endless tapes and supporting and driving rollers therefor for delivering to said table one after another sheets to be folded, stationary supporting-fingers for supporting said sheets between said tapes and table and a presser consisting of a rock-shaft and attached fingers which project beyond and over said stationary fingers and over the rear edge of the folding-table, substantially as herein described.

10. The combination of a cutting apparatus consisting of two rotary shafts and attached cutters, a folding apparatus, a set of sheet-carrying devices for presenting sheets to said cutting apparatus to be cut into sections, a second set of carrying devices for taking the cut sections from the first-mentioned set and carrying them toward the folding apparatus, means for driving the second set at a constant speed, means for driving the first-mentioned set at variable speeds always less than that of the second set, means for driving the said cutters during a portion of each of their revolutions at a speed which has a constant relation to that of the second set of carrying devices, and means for driving the said cutters during another portion of each revolution at a faster speed which varies as the speed of the first set of carrying devices varies, all substantially as and for the purpose herein described.

11. In a machine for cutting and folding paper, the combination of a cutting apparatus and means for presenting thereto a succession of detached sheets to be thereby cut into smaller sheet-sections, a stationary folding-table, sheet-carrying devices whereby the several sheet-sections cut from one of the first-mentioned detached sheets are delivered one at a time in a single or unfolded condition to said table with the head of one overlapping the tail of the preceding one and deposited one upon another on said table in direct contact with each other, and a folding-blade operating in an opening in said table to fold at once all the so-deposited sheet-sections, substantially as herein described.

12. The combination of a folding apparatus which comprises a slotted folding-table and a folding-blade, a sheet-carrying device having its carrying-surfaces in a plane higher than the plane of the folding-table for depositing thereon one after the other a plurality of sheets to be folded, and a reciprocating presser and means for operating the same for holding down the rear portion of an advanced sheet upon said table until overlapped by the front edge of a succeeding sheet, substantially as herein described.

13. The combination of a folding apparatus which comprises a slotted folding-table, a carrier comprising grooved rollers arranged in rear of said table for delivering thereto one after and upon another a plurality of sheets to be folded together, a reciprocating presser consisting of a rock-shaft arranged behind said rollers and fingers attached to said rock-shaft and projecting between said rollers and over the rear edge of said table for holding down thereon the rear portions of advanced sheets until overlapped by the front edges of succeeding sheets, and means for oscillating said rock-shaft, substantially as herein described.

EDGAR H. COTTRELL.
CHARLES P. COTTRELL.

Witnesses:
C. B. COTTRELL,
A. R. STILLMAN.